UNITED STATES PATENT OFFICE.

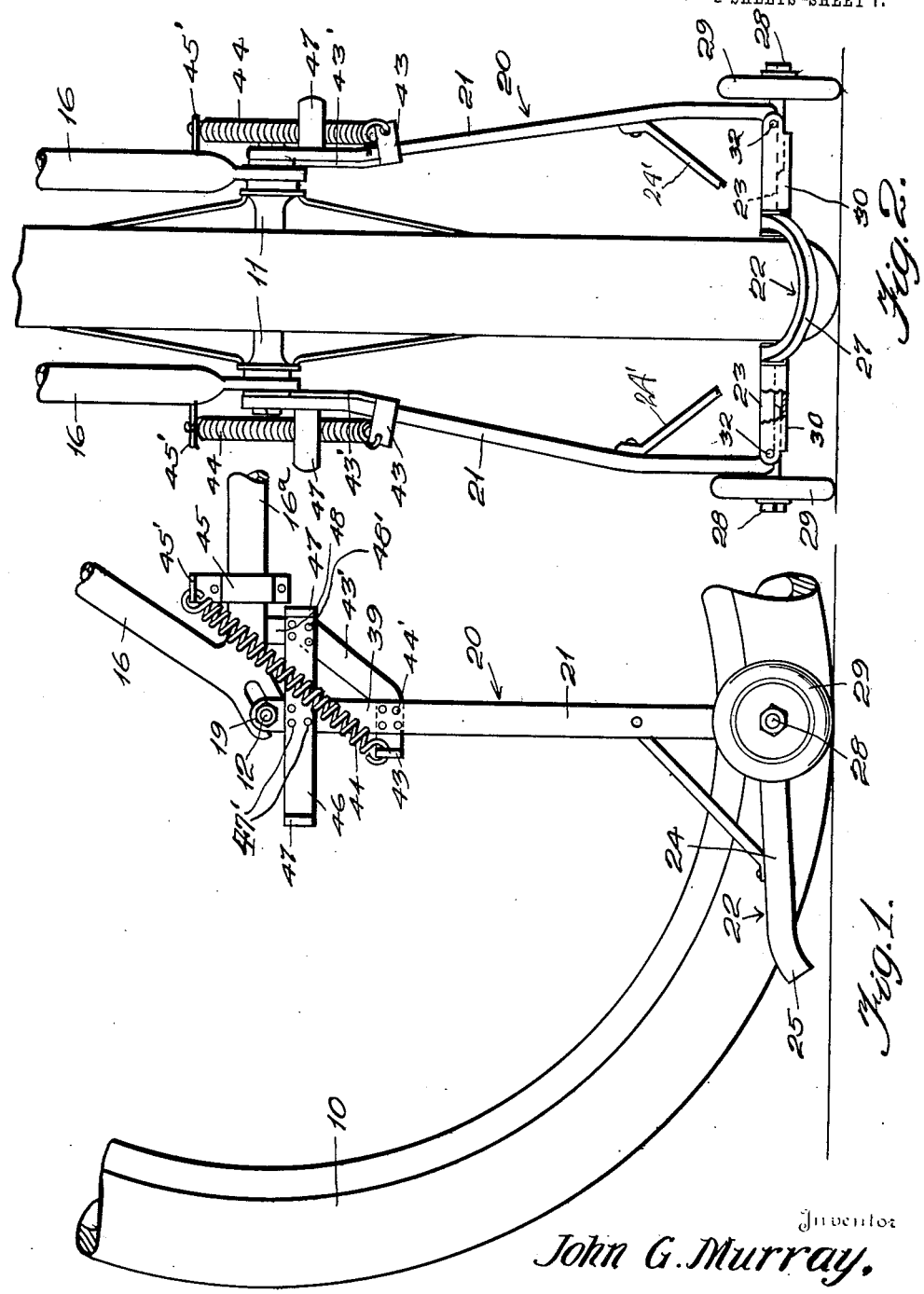

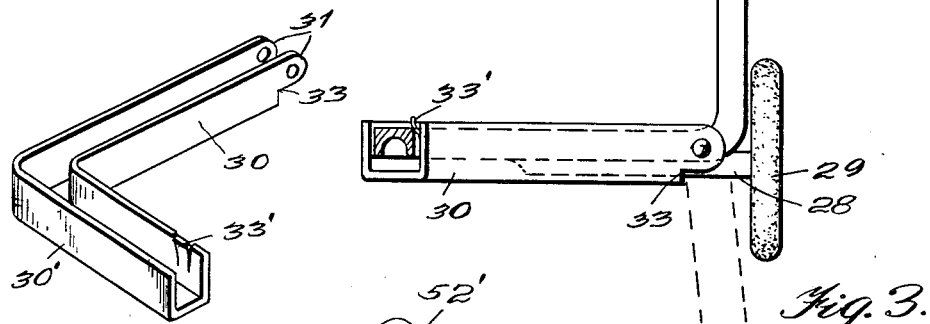
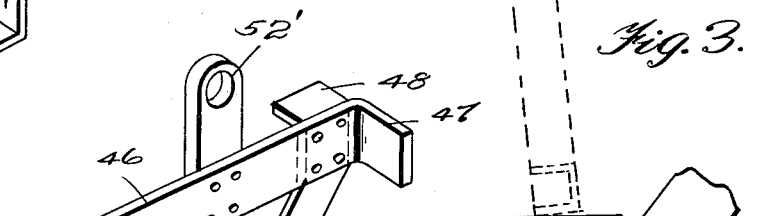
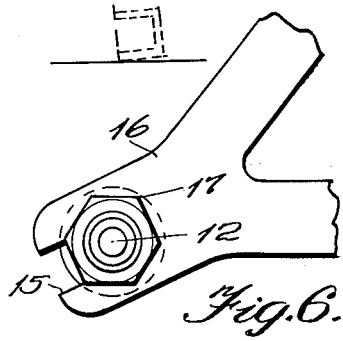
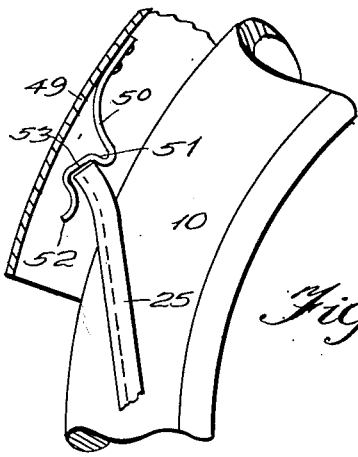
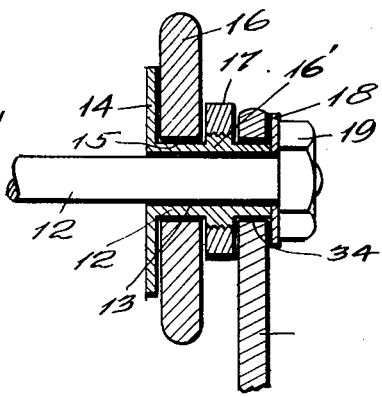

JOHN G. MURRAY, OF CHESTER, PENNSYLVANIA.

DEVICE FOR SUPPORTING CYCLES.

1,251,684.  Specification of Letters Patent.  Patented Jan. 1, 1918.

Application filed May 22, 1917. Serial No. 170,246.

*To all whom it may concern:*

Be it known that I, JOHN G. MURRAY, a citizen of the United States, residing at Chester, in the county of Delaware and State of Pennsylvania, have invented certain new and useful Improvements in Devices for Supporting Cycles, of which the following is a specification.

My invention relates to improvements in supports or stands for cycles, such as bicycles or motor cycles.

An important object of the invention is to provide means whereby the support may be shifted by the operator, during the travel of the cycle, to the active or inactive position.

A further object of the invention is to provide yielding means for normally holding the support in the lower or active position, when shifted thereto, thus allowing the support to partake of a proper upward movement upon encountering an obstruction in the road bed, such as a stone or the like, during the travel of the cycle.

A further object of the invention is to provide means for holding the support in the upper or inactive position, against rattling, such means being adapted to release the support upon the application of suitable pressure to the support shifting lever.

A further object of the invention is to provide a wheeled support for a cycle, which is adapted to contact with the road bed simultaneously with the wheel of the cycle, for preventing tilting of the cycle.

A further object of the invention is to provide a support of the above mentioned character, having means to elevate the same so that its wheels and the wheel of the cycle are supported out of contact with the road bed.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, Fig. 2 is an end elevation of the same, Fig. 3 is a side elevation of a support-leg, Fig. 4 is a perspective view of the same, Fig. 5 is a detail section through a bushing for the rear axle, Fig. 6 is an end elevation of the same, Fig. 7 is a side elevation of a spring catch for retaining the support elevated, and, Fig. 8 is a perspective view of one end of the support, showing an adjustable coupling bar, included in a different form of the invention.

In the drawings, wherein for the purpose of illustration is shown a preferred embodiment of my invention, the numeral 10 designates a wheel of a cycle, which for the purpose of illustration, may be considered as the rear wheel. This wheel embodies a hub 11, having an axle 12, as shown more clearly in Figs. 2 and 5. The axle 12 is of the floating type, and is adapted to be readily knocked out, for allowing the rear wheel to be quickly dismounted. The floating axle 12, as clearly shown in Fig. 5, extends at each end thereof through a bushing or tube 13, having a flange 14, upon its inner end. This bushing or tube is inserted within a longitudinal slot 15, formed in the rear side portions 16 of the frame of the cycle. Each bushing 13 is provided with an enlarged screw-threaded portion 16', arranged outwardly of the side portion 16 and carrying a lock nut 17, for clamping against such side portion. Beyond the enlarged screw-threaded portion 16', the bushing is continued in the form of a cylindrical extension 18, for a purpose to be described. The floating axle 12 is held against longitudinal displacement by means of nuts 19, having screw-threaded engagement with the opposite ends thereof. It is to be understood that the bushing 13 may be dispensed with, and the support to be described, pivoted directly upon the axle 12, which may or may not be of the floating type, while it is preferred to employ the bushing.

My support or stand comprises, as more clearly shown in Figs. 1 and 2, an approximately U-shaped member, designated as a whole by the numeral 20. This frame comprises sides 21, which are connected by a transverse bar or portion 22, preferably integral therewith. The material of the member or frame 20 is preferably channeled or U-shaped in cross-section, to provide strength and lightness. The transverse portion or bar 22 has outer horizontal portions 23, and the material of the bar is bent at a right angle, forming portions 24, included in a U-shaped member 25, which receives the wheel therein. As more clearly shown in Figs. 1, 2 and 3, spindles 28 are carried by the horizontal portions 23, and are arranged therebeneath, for connection therewith by any suitable means. Rotatably mounted upon the spindles 28 are tire carrying wheels 29, adapted to be arranged upon opposite sides of the wheel 10.

As more clearly shown in Figs. 2, 3 and 4, the numeral 30 designates substantially L-shaped support-legs, which are U-shaped in cross-section, and adapted when moved to the upper inactive position, to receive the portions 23 and 24 of the transverse bar. Each support-leg 30 is provided at its outer end with apertured ears 31, pivoted to the portion 23, at 32. The support-leg 30 is provided with a transverse shoulder 33, near the ears 31, which serve to positively limit the outward movement of the same. At their free ends, each support-leg 30 is provided with an inwardly bent resilient lip or catch 33', preferably stamped therefrom and adapted to engage over the portion 24, thereby holding the support-leg in the upper inactive position. The horizontal portions 30' of the support-legs provide feet for the same, thus preventing the same from being forced into the road bed, when in use.

In Figs. 1 and 2, the sides 21 of the supporting frame 20 are shown as formed integral, and in Fig. 5, the ends of these sides 21 have openings 34, pivotally receiving the cylindrical portions 18 of the bushings 13.

Arranged upon the inner side of each side 21 are diagonal bars or braces 43', secured thereto, as shown at 44'. The bar 43' is arranged near the inner end of the side 21 and is provided at its rear end with an apertured ear 43, having connection with a retractile coil spring 44, the opposite end of which is attached to an apertured ear 45'. This apertured ear is carried by a clamp or bracket 45 carried by a horizontal portion 16ª of the frame 16.

The numeral 46 designates an operating lever, provided at its ends with lateral extensions 47, which project outwardly to be engaged by the foot of the operator. This operating lever is rigidly secured, between its ends, to the inner end of the side 21, as shown at 47', and one end of the operating lever 46 is rigidly secured to the diagonal bar 43', as shown at 48'. A stop 48 is carried by the brace bar 43', and is adapted to engage with and beneath the horizontal portion 16ª, thus positively limiting the downward movement of the frame 20. While I have shown and described two operating levers 46, it is to be understood that one operating lever may be dispensed with if desired.

As shown in Fig. 8, each side 21 may be fore-shortened, and adjustably connected with a coupling bar 49'. The side 21 is provided with clamping bolts 50' extending into longitudinal slots 51, formed in a coupling bar 49'. By this means the supporting frame may be longitudinally adjusted, for receiving wheels of different diameters. The coupling bar 49' is provided at its inner end with an opening 52', pivotally receiving the reduced cylindrical portion 18 of the bushing 13. The brace bar 43', spring 44, and operating lever 46 are secured to the coupling bar 49', in the same manner in which the same are secured to the side 21, hereinabove described.

As more clearly shown in Fig. 7, the numeral 49 designates a mud guard, arranged near and above the rear wheel. Secured to this mud guard is a spring clip 50, having an upper stop shoulder 51 and a yielding depending lip 52, which is longitudinally curved, as shown. It is thus apparent when the frame 20 is swung to the uppermost position, the U-shaped portion 25 will pass within the recess 53, occurring between the stop shoulder 51 and the lip 52. This spring clip serves to hold the frame 20 in the uppermost position and prevents shaking or rattling of the same or parts thereof.

In the operation of the apparatus, the frame 20 is normally retained in the upper horizontal position. When it is desired to lower the frame 20, which may be accomplished while the vehicle is traveling, the operator places his foot upon the upper extension 47, and by exerting suitable pressure thereon pushes the frame 20 out of engagement with the spring clip 50, and swings the same to the lower or vertical position. The springs 44 will now serve to normally retain the frame 20 in this position, whereby the wheel 10 and the wheels 29 travel in contact with the road bed, and the frame 20 and associated elements prevent tilting of the cycle, when traveling or at rest. When it is desired to elevate the frame 20, the operator places his foot upon the forward extension 47, and by forcing the same rearwardly, the frame 20 is returned to the upper position, to be held therein, by the means hereinabove described.

Particular attention is called to the fact that the springs 49, while normally retaining the frame 20 in the lowermost or vertical position, will allow this frame to move rearwardly, upon the wheels 29 thereof contacting with an obstruction in the road bed, such as a stone or the like.

When the frame 20 is in the uppermost position the springs 44 are disposed above the axle 12, constituting the pivot of the frame 20, and when this frame is moved to the lowermost or vertical position, the springs are disposed beneath this axle or pivot.

The support-legs 30 are adapted to be swung to the lower vertical position, as shown in Fig. 3, and will then serve to support the frame 20, in a position so that the wheel 10 and the wheels 29 will be out of contact with the road bed. The horizontal portions 30' of these support-legs prevent the same from penetrating the road bed for a substantial distance.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. A supporting device for a cycle, comprising a support adapted for pivotal connection with the cycle and to be shifted to upper and lower positions, wheels carried by the outer end of the pivoted support, means for holding the pivoted support in the upper position, and yielding means for normally retaining the pivoted support in the lower position when moved thereto.

2. A supporting device for a cycle, comprising a support adapted for pivotal connection with the cycle and to be shifted to upper and lower positions, wheels carried by the outer end of the pivoted support, an operating lever connected with the pivoted support and serving to shift the same to upper and lower positions, means for holding the pivoted support in the upper position, and yielding means for normally retaining the pivoted support in the lower position when moved thereto.

3. A supporting device for a cycle, comprising a support adapted for pivotal connection with the cycle and to be shifted to upper and lower positions, an operating lever mounted upon the pivoted support near its pivot and extending laterally beyond the same in opposite directions, wheels carried by the outer end of the pivoted support, means for holding the pivoted support in the upper position, and yielding means for normally retaining the pivoted support in the lower position when moved thereto.

4. A supporting device for a cycle, comprising a support adapted for pivotal connection with the cycle, wheels connected with the support and adapted to be arranged upon opposite sides of the wheel of the cycle, and support-legs connected with the support near the wheels thereof and adapted to be shifted to an inner position and an outer position for projecting outwardly beyond said wheels for a substantial distance.

5. A supporting device for a cycle, comprising a support adapted for pivotal connection with the cycle and having parts thereof arranged upon opposite sides of the wheel of the cycle, wheels connected with the outer portion of the support and disposed upon opposite sides of the wheel of the cycle, support-legs pivotally connected with the support near said wheels and provided with enlarged feet, and means for retaining the support in the upper position.

6. A support for a cycle; comprising spaced side-members disposed upon opposite sides of the wheel of a cycle, and pivotally connected with the frame of the cycle; a connecting member including spaced longitudinal elements and a transverse element, the longitudinal elements being disposed upon the opposite sides of said wheel and secured to the side-members, the transverse element being adapted to be disposed at a substantial distance from the point of contact between the wheel and road bed and out of engagement with the road bed, when the side-members are swung to the lowermost position; and wheels connected with said support near the outer end thereof and adapted to be arranged upon opposite sides of the wheel of the cycle.

7. A supporting device for a cycle, comprising spaced sides adapted for pivotal connection with the cycle upon opposite sides of the wheel thereof, a transverse member connecting the outer portions of the spaced sides and bent rearwardly for providing an approximately U-shaped portion, wheels connected with the sides, and substantially L-shaped support-legs pivotally connected with the transverse member and formed substantially U-shaped in cross-section for the reception of portions of said transverse member.

8. A supporting device for a cycle, comprising an approximately U-shaped frame adapted for pivotal connection with the cycle and including spaced sides, an operating lever rigidly connected with the inner portion of one side and extending transversely thereof, a spring associated with the inner portion of the frame and serving to retain the same in the upper or lower position when moved thereto, means for holding the frame in the upper position, and wheels carried by the outer end of the frame.

9. A supporting device for a cycle, comprising a frame including spaced sides, wheels carried by the outer end of the frame, coupling bars longitudinally adjustably connected with the inner ends of the spaced sides and adapted for pivotal connection with the cycle, and yielding means for retaining the frame in the lower position.

10. A supporting device for a cycle, comprising a support adapted for pivotal connection therewith, wheels carried by the outer portion of the support, a stop carried by the support and adapted to contact with a portion of the cycle when the support is moved to the active position, and yielding means for normally retaining the support in the lower active position.

11. The combination with the frame of a cycle having openings formed therein, of bushings arranged within the openings and receiving the axle of the cycle and having pivotal portions, and a support comprising sides having openings formed therein for receiving the pivotal portions.

12. A supporting device for a cycle, comprising a pivoted support adapted for connection with the cycle and to be shifted to upper and lower positions, wheels carried by the outer end of the pivoted support, yielding means for normally retaining the pivoted support in the lower position when moved thereto, and means for shifting the pivoted support to the upper and lower positions, said shifting means being free from interference with the functioning of the yielding means.

13. A supporting device for a cycle, comprising a pivoted support adapted for connection with the cycle and to be shifted to upper and lower positions, wheels carried by the outer end of the pivoted support, a retractile coil spring connected with the frame of the cycle at a point near and spaced from the pivot of the support and with the support at a point near and spaced from the pivot of said support, and means to limit the upward and downward movements of the pivoted support so that the spring will be disposed sufficiently upon one side of the pivot of the support to normally retain the same in the upper or lower position.

14. A support for a cycle; comprising spaced side-members disposed upon opposite sides of the wheel of a cycle, and pivotally connected with the frame of the cycle; a connecting member including spaced longitudinal elements and a transverse element, the longitudinal elements being disposed upon the opposite sides of said wheel and secured to the side-members, the transverse element being adapted to be disposed at a substantial distance from the point of contact between the wheel and road-bed and out of engagement with the road-bed, when the side-members are swung to the lowermost position; axles secured to the connecting member; and wheels carried by the axles.

JOHN G. MURRAY.

Witnesses:
J. A. HUNTER,
MARY E. HUNTER.